Nov. 17, 1931.  F. W. HALL  1,832,629
APPARATUS FOR TREATING OIL WITH ALUMINUM CHLORIDE
Original Filed March 15, 1920
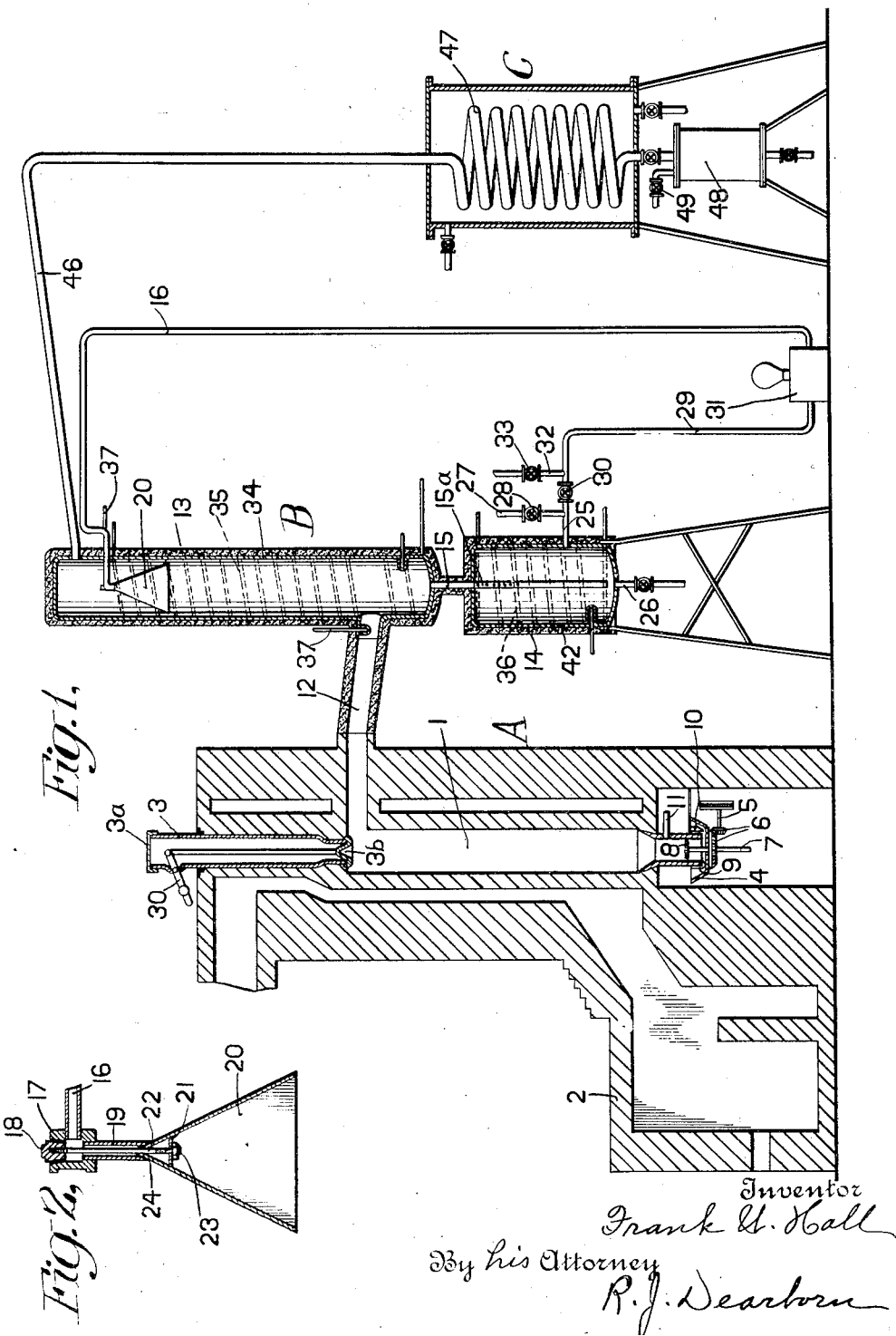
Inventor
Frank W. Hall
By his Attorney
R. J. Dearborn Patented Nov. 17, 1931

1,832,629

UNITED STATES PATENT OFFICE

FRANK W. HALL, OF PORT ARTHUR, TEXAS, ASSIGNOR TO THE TEXAS COMPANY, OF NEW YORK, N. Y., A CORPORATION OF DELAWARE

APPARATUS FOR TREATING OIL WITH ALUMINUM CHLORIDE

Original application filed March 15, 1920, Serial No. 365,859. Divided and this application filed May 25, 1927. Serial No. 194,043.

This application is a division of my Patent 1,647,445 dated November 1, 1927.

This invention relates to improving and treating hydrocarbon oils with anhydrous aluminum chloride. More specifically, it pertains to methods of treating oils in which the oils are subjected to the action of aluminum chloride vapors under various conditions as are hereinafter set forth.

One of the objects of my invention is to refine or purify petroleum products by subjecting them to a moderate heat while in the presence of the vapors of aluminum chloride. This treatment is especially effective in the improvement and purification of such petroleum products as lubricating oil and paraffin.

In all of the existing methods of manufacturing aluminum chloride of which I am aware the product is generated or produced in the form of a vapor which under existing practices is condensed by being deposited in condensers in the form of a solid. It is an object of my invention to provide means for the efficient condensing of aluminum chloride vapors suitable for use in the refining of oils by subjecting said vapors to the cooling action of a bath or spray of oil.

In treating of hydrocarbon oils with aluminum chloride it has been found convenient and advantageous to first mix a portion of the oil with anhydrous aluminum chloride forming a solution or mixture of aluminum chloride and oil which is in a form that can be transported in pipes and is thus much more easily admitted to stills or other vessels (particularly those of the continuous type) in which oil is treated with aluminum chloride, than is possible in cases where the dry chloride is used. One of the objects of my invention is to facilitate the preparation of a suitable compound or mixture of aluminum chloride and oil by passing the vapors of aluminum chloride through a bath or spray of hydrocarbon oil, subjecting the oil to the action of the vapors to form a compound of aluminum chloride and hydrocarbons possessing the desired characteristics.

Other objects and advantages of my invention will be set forth hereinafter and I will now describe the same with reference to the drawings, and point out the novel features thereof in the appended claims.

The accompanying drawings illustrate an apparatus embodying certain novel features and adapted for carrying out the processes disclosed herein, although it will be understood that any form of suitable apparatus may be used in carrying out said processes.

Referring to the drawings:

Figure 1 is a diagrammatical elevation of the entire apparatus certain parts being shown in section.

Figure 2 is a sectional detail of a special type of distributer, drawn to a larger scale.

A designates a retort or generator adapted for the manufacture of aluminum chloride and B designates the condensing or treating apparatus in which the aluminum chloride vapors are condensed in the presence of oil. In some of the methods of operation of my invention the apparatus B may serve as a still for cracking and vaporizing oil in which case a condenser for the oil vapors may be required such as that illustrated in the drawings and designated by C. The aluminum chloride vapors may be produced in any convenient manner, many of which are known to the art. The spent chloride sludge resulting from the treatment of oil with aluminum chloride and containing aluminum chloride may be heated and the aluminum chloride vapors driven off may be treated in accordance with the processes disclosed herein. The particular type of generator illustrated is adapted for the formation of the aluminum chloride by chlorinating a coked mixture of alumina and some carbon containing substance.

The retort 1 is adapted to contain the coked alumina-carbon composition, or other materials used in the reaction to form aluminum chloride vapors. It is supported in a suitable furnace 2 and is provided with a suitable charging mechanism which may be in the form of a combined hopper or feed arrangement and preheater indicated diagrammatically at 3 and provided with the movable lid 3a and the bell valve 3b operated by the lever 3c, a detailed description of this mechanism being omitted from this application as it per se forms no part of the present invention.

The discharging mechanism for removing the ash from the retort may be of any suitable type. For example, it may comprise a rotary pan 4 driven by a shaft 5 through gears 6. A perforated grate 8 is supported by a shaft 7 and is rotatable with the pan 4. The scraper 9 serves to remove the ash from under the retort so that it may be taken up by the discharge plow 10 which operates to scrape the ash over the edge of the pan 4. In operation the ash settling in the bottom of the retort forms a gas-tight seal between the retort and the pan 4, the rotation of which when combined with action of the scrapers serves to continuously remove spent ash from the retort. I have devised a discharging mechanism of the type illustrated, a detailed description of same being omitted from this specification as it constitutes a distinct and independent invention.

A chlorin inlet 11 admits chlorin gas or or other reagent to the charge in the retort and a preferably insulated outlet 12 conducts the vapors to the condensing apparatus B.

The preferred form of condensing, absorbing or treating apparatus comprises, as illustrated, an upper chamber or condenser 13 and a lower chamber or settling vessel 14, communication between the chambers being established by means of the pipe 15, which preferably extends into the vessel 14 to a point near the bottom thereof and which is perforated near its upper end, as indicated at 15a, to permit the gases accumulating in the vessel 14 to pass into the chamber 13. It is to be understood that it is not necessary that the condenser and settling vessel be constructed in the form of separate chambers; a single chamber may be employed, if desired, to serve the twofold function of treating vessel or condenser and settling chamber. However, I have obtained good results with the particular apparatus shown in the drawings.

Any suitable means for admitting oil to the treating vessel and bringing it in contact with the aluminum chloride vapors entering therein through the vapor line 12, may be employed. For example, a ring spray pipe arranged to maintain a film of oil over the inner surface of the chamber 13, may be employed advantageously. Various types of spraying devices may be substituted for that shown. In the type of mechanism illustrated a pipe 16 in communication with a suitable source of oil supply terminates in a T 17 (see Figure 2), having a plug 18 and a nipple 19. The distributor 20, which is preferably cone-shaped, may be equipped with the supporting plate 21 having a central hole to admit the supporting rod 22, which is held in position by the nut 23 and by being screwed into plug 18, thus supporting the distributor within the chamber 13. The lower part of the nipple is perforated or slotted as shown at 24, so as to allow the oil which passes into the nipple from the T 17 and pipe 16 to be admitted to the outer surface of the distributor 20, which is so arranged within the chamber 13 that the oil flowing over the surface thereof is distributed in a film to the inner surface of the chamber. It is to be noted that with this type of apparatus a descending flow of oil is subjected to an ascending current of aluminum chloride vapors, thus effecting an intimate contact between the reacting substances. While I consider this arrangement preferable, it is of course not essential to my invention.

The settling vessel 14 is provided with an outlet 25 for drawing off the supernatant oily layer that may accumulate therein and with a valved outlet 26 for removing residual or tarry materials. The outlet 25 has a branch pipe 27 having a valve 28, and communicates with the pipe 29 through the valve 30. The pipe 29 terminates in the intake of the pump 31 and the pipe 16 establishes a connection from the outlet of the pump to the distributor. The pipe 29 has a branch 32 equipped with a valve 33, through which fresh oil may be supplied from any suitable source (not shown). With the valve 30 closed and the valves 28 and 33 open, oil may be delivered by the pump through the line 16 and distributor 20 to the chamber 13 and the more liquid portions settling out in the chamber 14 may be drawn off through the pipes 25 and 27 to a suitable receptacle.

In cases where it is desirable to subject the same oil repeatedly to the action of the chloride vapors the valves 28 and 30 are closed and the valve 33 is opened until the requisite amount of oil has been admitted to the system when the valve 33 is closed and valve 30 is opened and the liquid circulated though the system as long as desired, the valve 28 being opened at suitable intervals to remove portions of the liquid and the valve 33 being used to permit the addition of fresh portions.

It may, in some cases, be desirable to have the pipes 27 and 32 terminate in a common receptacle (not shown). For example, with such an arrangement, if the valve 30 is closed a bulk supply of oil may be pumped from the common reservoir through the pipes 32, 29 and 16 to the condenser 13, drawing off portions from the settling vessel 14 into the common reservoir through the pipes 25 and 27 and continuously circulating the oil through the system until the oil in the reservoir has been sufficiently treated.

When employing the apparatus B for the preparation of the aluminum-chloride-hydrocarbon treating agent, and when it is desired to treat hydrocarbon oil to obtain a purifying and stabilizing action without production of any material proportion of lighter hydrocarbons, it is ordinarily undesirable to apply to the vessel B any heating other than that produced by the influx of hot chloride vapors. In many cases, however, particularly when it is desired to use the vessel B for the conversion of higher boiling hydrocarbons into lower boiling ones, the apparatus B may well be supplied with additional heating means and in the apparatus illustrated the chamber 13 is provided with a steam heating coil 35 and is protected by a jacket 34 of suitable insulating material. The settling vessel 14 is suitably equipped with a steam coil 36 and a jacket 42.

In order to effectively control the operation of my invention it is desirable to have thermometers 37 placed at various points in the apparatus. For example, thermometers are shown to be located as follows:

One at the mouth of the oil inlet pipe 16;
Another at the throat of the gas inlet passage 12;
Another near the bottom of the sublimer 13, and
Another near the bottom of the chamber 14.

In carrying on any of the processes herein disclosed there is more or less gas generated in the vessel 13 which should, therefore, be equipped with means for permitting the gases to escape, such as the gas vent 46. As the admission of moisture into the reaction vessel will interfere with the effective working of the process, the gas outlet is best constructed in a form that will serve to prevent the entrance of moisture into the chamber. This may be accomplished, for example, by providing a gas vent in the form of a U pipe. In cases where in the operation of the process oil vapors are generated, as is the case when converting higher boiling hydrocarbons to lower boiling ones by treating the oil with aluminum chloride vapors in the reaction chamber 13, and it is desired to remove the generated vapors and condense them, the line 46 may serve as a vapor line and may extend to the condenser 47, having the condensate receiver 48, equipped with the gas outlet 49. It is understood that when using the vessel 13 as a condenser of aluminum chloride vapors, or for the preparation of a mixture or solution of aluminum chloride and oil suitable for treating or purifying oil the condenser C is not necessarily required and the line 46 may in such cases terminate in the atmosphere.

In the operation of my invention with the herein described apparatus, the aluminum chloride vapors generated in any suitable manner pass through the vapor line 12 to the vessel 13 where the vapors come in contact with the oil which prevents the deposition of any solid aluminum chloride on the walls of the chamber and results in the formation of a mixture or composition or solution of aluminum chloride and hydrocarbons which materials drop into the settling vessel 14. I will not attempt to explain the chemical reactions which occur when hydrocarbons and vapors of aluminum chloride are brought into contact with each other; it is sufficient to state that there is more or less chemical action, the character and extent of which depends largely upon the temperature to which the substances are subjected during the contacting. For example, if the temperature is sufficient there will result a substantial decomposition of the hydrocarbons, higher boiling hydrocarbons being decomposed into lower boiling ones.

On the other hand, if the temperature be kept sufficiently low there will be no material formation of the light hydrocarbons but there will be more or less chemical reaction resulting in the removal of certain undesirable compounds or bodies from the oil and thus purifying and stabilizing it, while at the same time there is formed a sludge material containing aluminum chloride which material is useful as a treating agent in the decomposition of hydrocarbons. If the oil be repeatedly circulated through the aluminum chloride vapor zone or if its rate of flow therethrough be regulated properly, a large portion may be converted into an aluminum chloride hydrocarbon mixture or compound.

In any case there is in general produced a product in the settling vessel 14 which is found to consist, speaking broadly, of two immiscible layers; a top layer of a dark red oily liquid and a lower layer of a sludge or tarry material. The liquid materials may be drawn off through the outlet 25 and conveyed to a suitable receptacle or they may be conducted by means of the pump 31 back to the spray 20 and passed repeatedly through the chloride vapors as often as desired. The residue or tarry matters are withdrawn through the outlet 26.

When it is desired to form the reactive compound of aluminum chloride and oil suitable for use in cracking or decomposing higher boiling hydrocarbons into lower boiling ones, as for example, the conversion of gas oil, kerosene and other suitable distillates or residuums of petroleum into such light products as gasoline and naphtha, the aluminum chloride vapors are contacted with, or absorbed in, relatively cool oil. The temperature may be so regulated in the condenser B and the rate of flow of the oil so controlled that there will be no great amount of cracking when the aluminum chloride vapors and the hydrocarbons are brought into contact with each other, resulting in the production of the desired mixture or compound of aluminum chloride and hydrocarbons. The compound or mixture formed contains the aluminum chloride in solution or in suspension in the oil or intimately combined therewith.

The aluminum chloride hydrocarbon product is of a homogeneous nature and is freely mobile so that it may be readily pumped and handled. When hydrocarbon oil is heated in the presence of this product decomposition of higher boiling hydrocarbons into lower boiling ones takes place. It appears to be essentially non-volatile so that when it is heated in the presence of the oil, although vaporization of lower boiling hydrocarbons occurs, there is no appreciable volatilization of the compound as such or as aluminum chloride.

In the preparation of the reactive agent it is not necessary to separate the tarry compound from the supernatant oily layer, as the entire product may be withdrawn through the outlet 26 and conducted to a cracking still. Of course the oily liquid accumulating in the settling vessel may be drawn off and circulated through the system repeatedly so as to increase the proportion of compound in the liquid which is finally drawn off from the settling vessel and admitted to a cracking still. The operation may be so conducted that no substantial amount of the supernatant or less viscous product is admitted to the cracking still by carefully settling out the more viscous or tarry materials, which contain large proportions of aluminum chloride. It is preferable to carry on the operation in such a way that substantially all of the aluminum chloride is absorbed or chemically combined with the hydrocarbons so as to form a product containing no material proportion of free or uncombined chloride.

The aluminum chloride-hydrocarbon treating agent after having been prepared according to any of the methods herein disclosed, may be admitted to a still where hydrocarbon oils are distilled in contact therewith resulting in the formation of such volatile hydrocarbon oils as gasoline and naphtha.

In choosing an oil for the preparation of an aluminum chloride-hydrocarbon compound or mixture for use as a catalyst in the conversion of hydrocarbons it is preferable to employ the same type of oil in making the mixture or compound which it is intended to subject to the conversion process. For example, if I intend to crack gas oil I will utilize gas oil in the preparation of the chloride mixture or compound.

If it is desired to produce gasoline or other light hydrocarbons from higher boiling oils a flowing body of the oil to be converted may be brought into contact with the vapors of aluminum chloride. Thus the oil may be charged by the pump 31 through the line 16 and thence to a cracking chamber B. The oil while in transit through the cracking chamber is thus contacted with the aluminum chloride vapors entering from the passage 12. It is to be noted that by contacting a flowing body of oil with a current of aluminum chloride vapors an effective control of the cracking operation may be had. By regulating the amount of heat supplied by the heating coil 35 and by regulating the flow of oil through the cracking chamber the operation may be so conducted as to enable the production of a maximum quantity of light oil of the boiling point desired with a minimum production of fixed gas. A convenient method of maintaining the proper temperature in the cracking zone or of assisting in the maintenance thereof consists in preheating the oil before its admission to the cracking chamber. The generated vapors are removed from the cracking chamber by means of the vapor line 46 and the gasoline or other light oil desired is condensed in the condenser C and collected as a distillate in the receiver 48. The sludge or tarry matters together with certain oily material accumulate in the settling vessel 14 from which they may be removed as desired. By distilling the supernatant oily material certain of the light hydrocarbons which did not pass through the vapor line from the cracking chamber 13 may be recovered. If the oil and sludge be drawn off and distilled together a further decomposition of the oil is effected resulting in the formation of additional light hydrocarbons. It is understood that by means of the pump 31 the oil to be cracked may be circulated repeatedly through the cracking chamber 13.

One feature of my invention contemplates the treating, improving and purifying of hydrocarbon oils without carrying on material decomposition and formation of any substantial amount of lighter products. This treatment is especially designed for treating either distillates or residuums resulting from the distillation of crude petroleums and comprises subjecting them to the action of the vapors of aluminum chloride while under moderate heating. The process is especially efficient for improving the color and rendering marketable the lubricating oils and paraffin waxes. The oil to be treated may be placed in any suitable agitator or treating vessel and the chloride vapors bubbled through the body of oil. In carrying on the process with the type of apparatus illustrated the oil is introduced into the treating vessel 13 in the form of a film over the inner surface thereof and subjected to the action of the aluminum chloride vapors issuing from the vapor line 12. The temperature in the vessel 13 is so regulated that there is not sufficient heat for any substantial conversion of the oil into light products but is nevertheless sufficient to enable the aluminum chloride vapors to exert their purifying effect upon the oil. The resulting products descend to the settling vessel 14 where the tarry or sludge materials are allowed to settle to the bottom, leaving an oily, liquid stratum on top. This upper stratum contains the treated oil together with some aluminum chloride and compounds thereof.

This liquid is removed through the outlet 25 and conducted to a suitable vessel where it may be washed with water to break up the aluminum chloride hydrocarbons and remove the aluminum chloride by hydrolysis. The oil is then washed with soda ash to remove any free hydrochloric acid formed by the hydrolysis. The soda ash is then thoroughly washed out and the oil dried in any suitable manner, as by means of filtering. The treated oil instead of being washed with water as above indicated, may be treated in some suitable manner to remove the chloride.

It is understood that the oil to be treated may be circulated through the treating vessel 13 and subjected to the action of the aluminum chloride vapors repeatedly until it has been thoroughly purified. The sludge or tarry matters that are settled out of the oil after it has been subjected to the action of the chloride vapors may be introduced into a cracking still and utilized as a catalyst in the decomposition of hydrocarbon oils as the sludge contains considerable chloride.

I have discovered that the practice of my invention of treating hydrocarbon oils with aluminum chloride vapors may result in the formation of certain products which, so far as I know are novel in the art, that is products may be made and results obtained by the treating of oil with aluminum chloride vapors that have not been produced or obtained in any of the old methods of treating.

Apparatus of preferred form and construction has been illustrated and described for the purpose of showing a way in which this invention may be used, but the inventive thought upon which this application is based is broader than this illustrative embodiment thereof, and I therefore intend no limitation other than those imposed by the appended claims.

What I claim is:

1. Apparatus for treating oil with aluminum chloride comprising a retort adapted to generate aluminum chloride vapors, a chamber, means for conducting aluminum chloride vapors from the retort into the chamber, means for charging oil to the chamber and spreading the oil in a film over the inner surface thereof, and an outlet means for withdrawing vapors from the upper portion of said chamber.

2. Apparatus for treating oil with aluminum chloride comprising a retort adapted to generate aluminum chloride vapors, a chamber, means for heating said chamber, means for conducting aluminum chloride vapors generated in the retort to an intermediate point in said chamber, means for introducing oil in a film at a higher point in said chamber, means for drawing off material from the lower part of said chamber, and an outlet means for withdrawing vapors from the upper portion of said chamber.

3. In an apparatus for contacting oil and aluminum chloride which consists of a chamber and means for admitting aluminum chloride vapors thereto, the combination of oil feeding and spreading means comprising a pipe nipple having one end formed to receive the apex of a cone said end of the pipe being notched in an ordered manner and a cone having an apex engaged within the said end of the feed nipple.

4. Apparatus for condensing or absorbing aluminum chloride vapors comprising an upper and lower chamber in communication with each other, means for admitting aluminum chloride vapors to the lower part of the upper chamber, means for feeding oil to the upper part of said upper chamber and distributing the oil in a thin film interiorly to the said chamber walls, and an outlet means for withdrawing vapors from the upper portion of said upper chamber.

5. Apparatus for condensing or absorbing aluminum chloride vapors comprising an upper and lower chamber, means for admitting aluminum chloride vapors to the lower part of the upper chamber, means for feeding oil to the upper part of said upper chamber and distributing the oil in a thin film interiorly of the said chamber walls, communication means between upper and lower chamber comprising a pipe leading from the bottom of the upper chamber to near the bottom of the lower chamber, the said pipe having a perforation near the top of the portion imposed within the lower chamber, the means of communication between said upper and lower chambers as described forming a liquid conductor from the upper chamber to the lower chamber while permitting the flow of gas countercurrent to the liquid from the lower to the upper chamber.

6. An aluminum chloride condenser comprising an upper and lower chamber, the upper chamber having means for admitting aluminum chloride vapors thereto, means for continuously introducing a cooling liquid to said chamber, means for conducting the resultant mixture from the upper chamber to the lower chamber, means for withdrawing the residual content of the said mixture and means for withdrawing the lighter portion of the resultant mixture from a higher point in the said lower chamber, and an outlet means for withdrawing vapors from the upper portion of said upper chamber.

7. In an oil treating apparatus of the type described a reaction apparatus comprising an upper chamber having means for admitting aluminum chloride vapors thereto, means for continuously introducing the liquid to undergo treating, and heating means whereby a given temperature of the oil undergoing treatment is maintained, a lower chamber having means for collecting the resultant mixture containing the treated oil and the condensed aluminum chloride, means for separating out the more liquid portions of said resultant mixture, means for continuously withdrawing from an intermediate point of the lower chamber the said more liquid portions, means for discharging from the bottom of the lower chamber the less liquid portions and heating means whereby a given temperature within the said chamber may be maintained.

8. Apparatus for treating oil with aluminum chloride comprising a retort adapted to generate aluminum chloride vapors, a chamber, means for conducting aluminum chloride vapors from the retort into the chamber, a conical distributor in the upper part of said chamber, means for discharging oil over the external periphery of the distributor so as to form an annular film of oil in the chamber.

In witness whereof I have hereunto set my hand this 16th day of May, 1927.

FRANK W. HALL.